United States Patent Office 3,113,005
Patented Dec. 3, 1963

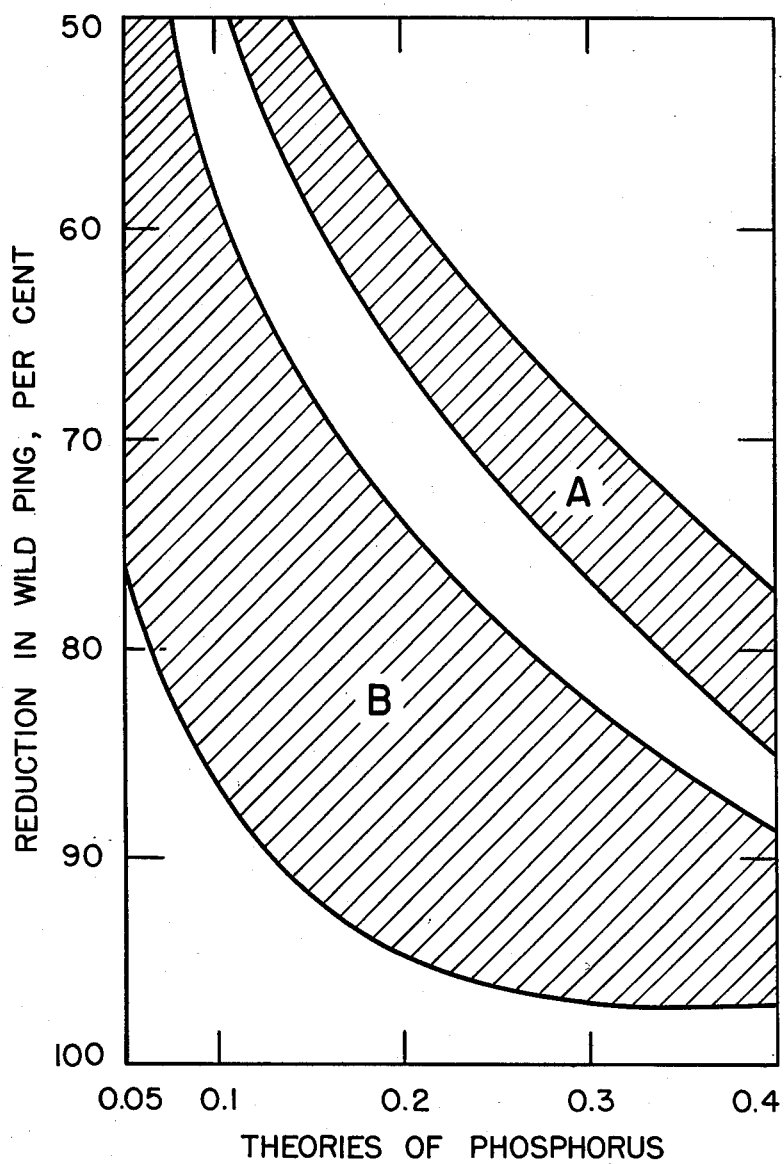
LEWIS F. GILBERT
INVENTOR.

3,113,005
GASOLINE FUELS
Lewis F. Gilbert, Detroit, Mich., assignor to Ethyl Corporation, New York, N.Y., a corporation of Virginia
Filed Nov. 5, 1953, Ser. No. 390,287
2 Claims. (Cl. 44—69)

This invention relates to adjuvants for organolead-containing fuels and more particularly to leaded finished fuels for internal combustion engines containing such adjuvants.

When conventional organolead-containing compositions are utilized in modern internal combustion engines of the spark-ignition type, difficulties are frequently encountered. Notwithstanding the high degree of efficiency of the usual scavengers which are generally organic bromine and/or chlorine compounds, the accumulation of engine deposits in combustion chambers and on engine parts cannot be entirely prevented. This accumulation is particularly prevalent when such engines are operated under conditions of low speed and light load as, for example, when passenger cars are operated under conditions normally encountered in metropolitan localities. As a result of the notable improvements in fuel antiknock quality which have been made in recent years, such deposits are of not much significance in low compression engines. However, the trend in the automotive industry is to continually increase the compression ratios of engines in passenger cars and trucks to obtain increased engine efficiency, and in present-day engines the accumulation of deposits results in a number of serious problems. Chief among these are deposit-induced autoignition or wild ping, spark plug fouling, octane requirement increase and the like.

Ordinary detonation in the internal combustion engine has been defined as the spontaneous combustion of an appreciable portion of the charge, which results in an extremely rapid local pressure rise and produces a sharp metallic-sounding knock. Its control may be effected by retarding ignition timing, by operating under part throttle conditions, by reducing the compression ratio of the engine and by using fuels having high antiknock qualities; that is, by using an organolead-containing fuel. Deposit-induced antoignition, frequently termed wild ping, may be defined as the erratic ignition of the combustible charge by combustion chamber deposits resulting in an uncontrolled combustion somewhat similar to knocking and occurring either continuously or in isolated bursts. Aside from the nuisance experienced by the passenger car operator, deposit-induced autoignition often produces deleterious effects such as loss of power and of fuel economy. Moreover, wild ping results in rough engine operation and tends to increase the wear of engine parts, promotes piston burning and the like. In contrast to ordinary detonation, wild ping cannot be satisfactorily controlled by retarding ignition timing, nor by operating under part throttle conditions. Inasmuch as automotive engineers are desirous of utilizing in internal combustion engines the highest compression ratios permitted by the commercially available fuels, the reduction of compression ratios to eliminate this problem of autoignition is not desirable nor feasible. Indeed, it is the consensus of opinion among the designers of internal combustion engines that engine developments are greatly hindered by the limitations imposed by deposit-induced autoignition.

It is evident that the present requirement for fuel having high antiknock qualities shall be greatly surpassed by future requirements. Notwithstanding attempts to attain these qualities by alternative means, it is entirely probable that the most practical method for the attainment of high octane fuels is by the use of antiknock agents, particularly of the organolead type. Although as indicated, detonation can successfully be obviated by the use of organolead antiknock agents such as tetraethyllead, it has been found that the severity of the wild ping problem increases with the lead concentration of the fuel. Hence, the automotive industry is faced with the dilemma resulting from the fact that each time the lead level of the fuel is raised to conform with increases in compression ratio, deposit-induced autoignition generally becomes more severe. As a result, there is an important need for a new and improved method for avoiding or reducing the detrimental effects of deposit-induced autoignition.

Another problem directly attributed to the presence of engine deposits is spark plug failure, commonly termed "spark plug fouling." This results from the formation of electrically conductive deposits on the firing end of spark plug insulators which decrease the resistance between the spark plug electrodes. Under such circumstances, the production of a spark at the spark gap is prevented. In some cases, additives can be introduced in the fuel to affect the deposits so that shunting does not take place. However, for the most part it has been found that most additives heretofore known to reduce spark plug failure also reduce exhaust valve life. This reduction in exhaust valve life is a reduction in the length of time during which the valve operates without either excessive leakage or mechanical failure. Such effects in turn result from corrosion and/or burning characterized by the weight loss of the total valve, mostly in the head and throat area of the valve, and the local removal of metal from the valve face resulting in valve leakage.

It is an object of the present invention to provide improved organolead-containing fuel. It is likewise an object of this invention to provide means of improving hydrocarbons of the gasoline boiling range containing organolead antiknock agents. A particular object of this invention is to provide an improved fuel adapted for use in spark-fired internal combustion engines comprising a tetraethyllead antiknock fluid and an adjuvant. An additional object of the instant invention is to provide means of obviating deposit-induced autoignition, spark plug fouling, and other secondary problems associated with the use of organolead-containing compositions while keeping the exhaust valve life relatively high. Other important objects of this invention will be apparent from the discussion hereinafter.

I have made the surprising discovery that gasoline-soluble phosphorus compounds in which a sulfur atom is directly attached to a phosphorus atom when employed as fuel additives produce unexpectedly great reduction in deposit-induced engine problems. This is particularly striking from at least two aspects. First, phosphorus compounds not containing phosphorus-to-sulfur linkages which have hitherto been described and used for my purposes, have not resulted in anywhere near as great a reduction in such problems. Second, the art appreciates that sulfur-containing compounds when present in gasoline are normally extremely offensive, particularly from the standpoints of gum formation, loss in antiknock effectiveness and the like. However, my adjuvants, contrary to expectations, not only possess enhanced effectiveness in the minimization of deposit-induced engine problems but do not bring about such expected deleterious side effects.

According to the present invention hydrocarbon-soluble phosphorus compounds containing at least one phosphorus-to-sulfur bond have been found unusually effective in reducing both wild ping and spark plug fouling, while not materially decreasing exhaust valve life nor materially increasing octane number requirement increase. Such enhanced effectiveness of my adjuvants exists even when compared with similar or homologous compounds that do not contain sulfur bonded to phosphorus. A preferred class of phosphorus additives, having a molecular weight of at least about 300, of the present invention comprises those which are characterized by the fact that all chalcogen (oxygen or sulfur) atoms therein which are singly bonded to phosphorus atoms are in turn singly bonded to a single type of organic radical. This organic radical is selected from the class consisting of alphyl, cycloalkyl, aralkyl, and aryl having straight chain alkyl substituents thereon. The FIGURE of the drawing illustrates the surprising property of my additives in virtually eliminating wild ping.

Referring to this FIGURE, there is shown a chart which graphically displays the reduction in wild ping as compared with the quantity of adjuvant added to a fuel containing 3.0 milliliters of tetraethyllead as a conventional antiknock mixture and used in a single-cylinder CFR L-head engine during a standard 40 hour test procedure. The ordinates of the graph represent the reduction in wild ping based upon the wild ping taking place in the absence of additive. The abscissas represent the quantities of additives employed based on the theoretical proportions of phosphorus required to react with the lead to form lead ortho phosphate, which quantity is two atoms of phosphorus per three atoms of lead.

Referring now specifically to the FIGURE, the uppermost band represented as band A is illustrative of the reduction in wild ping produced by representative phosphorus compounds which do not contain phosphorus-to sulfur bonds. The lower band, band B, shows the surprising enhanced minimization of this deposit-induced engine phenomenon resulting from the employment of representative members of the adjuvants of this invention. It will be apparent, therefore, that while the phosphorus compounds not containing a phosphorus-to-sulfur bond produce a reduction in deposit-induced autoignition, the adjuvants of this invention are considerably more effective in this regard. Thus, even phosphorus compounds which contain a phosphorus atom not bonded to sulfur are not capable of exerting the extreme effectiveness in the minimization of wild ping as effected by my adjuvants. Similarly, mixtures of phosphorus-containing compounds and sulfur-containing compounds are incapable of providing the benefits accruing from the practice of my invention.

To illustrate more specifically the data shown graphically in the FIGURE, typical adjuvants meeting the criteria of this invention were tested at a practical concentration of 0.1 theory of phosphorus in a leaded fuel.

When tri-m-cresyl thionophosphate was employed at a concentration of 0.1 theory of phosphorus in a commercial fuel containing 3.0 millimeters of tetraethyllead as a conventional antiknock mixture there resulted a reduction in wild ping of 78 percent. In contrast, when the same concentration of phosphorus as tri-o-cresyl phosphate was tested under the same conditions a reduction in wild ping of but 45 percent was obtained. Therefore, a typical adjuvant of this invention was found to be about 173 percent more effective than an almost identical material not possessing a phosphorus-to-sulfur bond.

To further illustrate the data shown in the FIGURE, when the product obtained by reacting one mole of phosphorus pentasulfide with approximately 2.2 moles of a mono-olefin polymer possessing an average molecular weight of about 420, the reaction being conducted at a temperature of about 400 F.; the lithium salt of the preceding reaction product obtained by reacting 201.5 parts by weight of the product with 53 parts by weight of lithium hydroxide monohydrates at 80° C.; the product obtained by reacting 283 parts by weight of phosphorus pentasulfide with 944 parts by weight of dodecyl amine at a temperature of about 260° C.; phosphorus sesquisulfide; and triphenyl phosphine sulfide were employed there resulted a reduction in wild ping of 72, 65, 71, 71 and 63 percent respectively. It will be noted, therefore, that these typical adjuvants of my invention all resulted in a greater reduction in wild ping than that produced by tri-o-cresyl phosphate at the same concentration of phosphorus.

Moreover, at 0.2 theory of phosphorus, another common and practical concentration of a phosphorus fuel additive, typical additives containing at least one phosphorus-to-sulfur bond such as phosphorus sesquisulfide and the lithium salt of the phosphorus pentasulfide-420 molecular weight mono-olefin polymer reaction product described hereinabove, reductions in wild ping of 80 and 74 percent respectively were obtained. On the other hand, at this same concentration of phosphorus, tri-o-cresyl phosphate and trimeric phosphonitrilic chloride, neither of which contains a phosphorus-to-sulfur bond, produced a reduction in wild ping of only 63 and 59 percent respectively.

Not only are the adjuvants of this invention more effective at common concentrations such as 0.1 and 0.2 theory of phosphorus than phosphorus additives not of my invention, but my adjuvants are likewise more effective at lower concentrations. To illustrate, at a concentration of 0.05 theory of phosphorus the product obtained by reacting at a temperature of 350° F. one mole of phosphorus pentasulfide with approximately 2.2 moles of a mono-olefin polymer possessing an average molecular weight of about 140, produced a reduction in wild ping amounting to 76 percent. On the other hand, at the same concentration of phosphorus, tri-o-cresyl phosphate reduced wild ping by only 20 percent. Thus, a typical adjuvant of this invention at a concentration of 0.05 theory of phosphorus resulted in over a 300 percent greater reduction in wild ping than a phosphorus additive not containing a sulfur-to-phosphorus bond.

Furthermore, the above-described 76 percent reduction in wild ping produced by a typical additive meeting the criteria of this invention was substantially greater at 0.05 theory of phosphorus than the reduction produced by 0.2 theory of phosphorus as tri-o-cresyl phosphate; that is to say, a representative adjuvant of this invention was found to be more effective than a phosphorus additive not of my invention even when the latter was used at a fourfold increase in phosphorus concentration. Likewise, other typical additives of this invention at a concentration of 0.1 theory of phosphorus as discussed hereinabove produced reductions in wild ping at least equal to that produced by tri-o-cresyl phosphate at twice the concentration. It will be appreciated that this enhanced effectiveness is not only important from the greater reduction in wild ping thereby provided, but also by the fact that I can employ smaller concentrations of my additives to obtain this enhanced effectiveness while concurrently minimizing secondary problems such as loss in exhaust valve life produced by amounts of conventional phosphorus additives required to produce this degree of wild ping reduction.

My adjuvants containing at least one phosphorus-to-sulfur bond when used in conjunction with an organolead compound are employed in concentrations such that there is a total from between about 0.05 to about 0.4 theory of phosphorus. One theory of phosphorus is defined as the amount of phosphorus required to react with the lead to form lead ortho phosphate; that is, two atoms of phosphorus per three atoms of lead. It is preferable to employ an amount of my adjuvants such that there is an amount of phosphorus between about 0.1 and about 0.3 theory of phosphorus.

Generally speaking, although addition agents possessing the criteria of this invention possess enhanced wild ping suppressing characteristics when contrasted to phosphorus additives not of my invention at even lower concentrations than 0.05 theory as shown by the FIGURE, practical difficulties are encountered in the employment of such low concentrations. These result from the fact that inmodern multi-cylinder engines the complexities of intake manifolding present distribution difficulties. That is to say, the art appreciates that because of manifolding, the various cylinders of the engine receive disproportionate amounts of fuel. Thus, when the total fuel is inducted the additive is disproportionately introduced to the various cylinders. In addition because of the variance in the boiling points of the constituents of gasoline some of the fuel is inducted by aspiration, some by vaporization and some by liquid flow to the inlet ports. This produces an additional condition such that should less than the minimum preferred amount of additive be employed certain cylinders will receive less than that required in the fuel to produce the desired reduction in wild ping, spark plug fouling, and the like. This amount is greater than that required to obtain the same effect in a single cylinder engine. Thus, to assure the presence of a sufficient amount of my enhanced addition agents to all cylinders I find it advantageous to employ a concentration of at least about 0.05 theory of phosphorus in my finished fuels.

Further inspection of the FIGURE of the drawing reveals that additives containing at least one phosphorus-to-sulfur bond are likewise more effective in minimizing wild ping than phosphorus additives not meeting this criterion at higher concentrations of phosphorus. For example, at a concentration of 0.3 theory of phosphorus the product obtained by reacting approximately 2.2 moles of a mono-olefin polymer possessing an average molecular weight of 140 with one mole of phosphorus pentasulfide at a temperature of 350° F. virtually entirely eliminated wild ping by reducing this deposit-induced engine problem by 91 percent. As the FIGURE of the drawing indicates the unpredictably great effectiveness of my adjuvants likewise exists when they are employed at a concentration of about 0.4 theory of phosphorus. Generally speaking, although even greater concentrations of my adjuvants can be utilized as addition agents for hydrocarbons of the gasoline boiling range, it is preferable not to exceed this concentration. I have found that amounts in excess of about 0.5 theory of phosphorus result in an increase in secondary problems such as decrease in exhaust valve life.

The minimum of concentration of the additive of this invention to be employed in a fuel is the amount which reduces by 50 percent the equilibrium total wild ping rate in a single cylinder engine in which the fuel is totally inducted compared to the equilibrium total wild ping rate when said engine is operated on the fuel without the additive. In general I have found that 0.05 theory of phosphorus in the fuel is the minimum concentration which reduces a single cylinder engine equilibrium total wild ping rate by 50 percent and that at or above this concentration the fuel when employed in a multi-cylinder engine achieves a practical reduction in wild ping. A method for determining this minimum concentration comprises first operating a clean single cylinder engine in which the fuel is totally inducted on the leaded fuel under consideration without the additive of this invention until equilibrium deposit formation occurs, thereby establishing the maximum equilibrium total wild ping rate, thereupon continuing the operation of said engine with the same fuel containing a known amount of the additive of this invention until a new low equilibrium total wild ping rate is achieved. By successive operations the minimum concentration required to reduce this equilibrium rate by 50 percent is determined.

To summarize, referring again to the drawing, it will be seen that the materials of this invention achieve 50 percent reduction in wild ping readily when employed in the lower concentrations specified, while materials previously suggested for this purpose only achieve this reduction at considerably higher concentrations. Furthermore, it will be seen by reference to the drawing that to obtain substantially complete reduction in wild ping, that is on the order of about 90 percent or better, the adjuvants of this invention achieve this result within the preferred range of 0.1 to 0.3 theories of phosphorus, while much higher concentrations, that is 0.4 and as much as 0.6 or 0.7 theories, of the additives previously suggested are required. Such higher concentrations pose secondary problems associated with such high concentrations.

My adjuvants, with the exception of phosphorus sesquisulfide, are organic compounds which contain per molecule from 1 to 4 atoms of phosphorus. When there are from 2 to 4 atoms of phosphorus in the molecule these can be connected by phosphorus-to-phosphorus bonds, phosphorus-to-carbon bonds, phosphorus-to-oxygen bonds or phosphorus-to-sulfur bonds.

My organic adjuvants should contain an amount of phosphorus from between about 5 to about 29 percent by weight. These are the ranges of phosphorus which I have found that produce the important and unexpected enhanced activity possessed by my adjuvants, particularly regarding the reduction in wild ping. If the percentage of phosphorus is below about 5 percent a proportionately greater concentration of the additive will be required to obtain such enhanced activity. But on the other hand, if the phosphorus content of such an adjuvant exceeds about 29 percent then the relative hydrocarbon solubility of the additive is decreased frequently to the point at which it no longer is engine inductible.

The amount of sulfur which is bonded to phosphorus in my organic adjuvants is from between about 6 to about 63 percent by weight of the compound. Such ranges have been found to cooperate with the amount of phosphorus as above described to provide my extremely effective adjuvants. Thus, so long as there is from one atom of phosphorus to four atoms of sulfur per molecule to one atom of phosphorus to one atom of sulfur per molecule the benefits obtainable from my organic adjuvants obtain. Hence on an atom weight basis my organic adjuvants possess a phosphorus-to-sulfur ratio of from between about 0.24 to 1 and about 0.96 to 1.

My organic adjuvants are gasoline-soluble compounds containing either tri- or pentavalent phosphorus. I have found that it is preferable to employ those which are liquids at ordinary temperatures (20 to 30° C.) because of the fact that my liquid additives are more readily inducted into multi-cylinder engines.

My organic adjuvants containing at least one phosphorus-to-sulfur bond preferably contain hydrocarbon radicals of an open chain character. I have found that generally speaking open chain adjuvants within the purview of this invention are more soluble in present-day gasolines and are thus capable of exerting their potential maximum effectiveness to a greater degree than phosphorus compounds containing carbocyclic radicals.

My organic adjuvants preferably possess a molecular weight between about 100 and about 1100. This results from the fact that organic phosphorus compounds containing at least one phosphorus-to-sulfur bond of a lower molecular weight than about 100 are either too unstable or too reactive to be suitable as fuel addition agents. For example, many of such compounds are readily susceptible to hydrolysis. On the other hand, if the molecular weight is very much greater than about 1100 the compound, although generally soluble in gasoline, is not readily inductible into modern-day cylinder engines. The optimum molecular weight for my compounds, particularly my preferred organic compounds, is between about 300 and about 600. The lower limit is particularly important because compounds having a molecular weight less than about 300 tend to cause certain deleterious side effects such as antiknock destruction and the like. In the case of my preferred open chain adjuvants containing a phosphorus-to-sulfur bond, it is preferable to keep the molecular weight of the additive less than about 600. This assures the presence of sufficient phosphorus and sulfur in a readily soluble form, particularly in present-day fuels.

The phosphorus in the molecule of my addition agents must be directly attached to at least one sulfur atom. Thus compounds which contain both phosphorus and sulfur, but which elements are not directly linked to each other are incapable of exerting the extreme effectiveness of my additives. Moreover, mixtures of organic phosphorus compounds and organic sulfur compounds do not cooperate to produce such increased effectiveness. To establish this fact a standard spark plug fouling test was conducted wherein 0.2 theory of phosphorus as mixed tricresyl phosphates was used in conjunction with added sulfur in the form of conventional organic sulfur compounds normally found in petroleum hydrocarbons. This phosphorus additive when admixed with 0.12 percent of sulfur in the form of a physical mixture rather than a chemical union of the elements by means of covalent bonds required 91 hours for three spark plug failures to occur. At the same concentration of phosphorus, tri-m-cresyl thionophosphate required 114 hours for such spark plug failures to occur. On this basis, therefore, it is reasonable to conclude that the presence of phosphorus-to-sulfur bond in my adjuvants is in some currently unexplainable manner interwoven within their increased effectiveness.

To further illustrate the remarkable effectiveness of the organolead-containing compositions of this invention consideration was given to the problems of octane requirement increase and wild ping as determined in a long term single-cylinder engine test procedure. This test consists of operating a CFR single-cylinder L-head engine in conjunction with the electronic deposit ignition counter as described hereinbefore. In this instance, primary observations are the rate of deposit-induced autoignition and the octane number requirement increase (ORI) attributable to deposits, the former using the electronic counter and the latter by using primary reference fuel blends.

The engine is operated on a cycling schedule whereby for 30 seconds it is operating under idling conditions whereas for 150 seconds, it is under full throttle conditions. By so doing, the magnitude of the above problems is increased. In all instances the test fuels contained 3 milliliters of tetraethyllead as a conventional antiknock fluid in addition to the phosphorus additives. Comparisons were made with base lines obtained using the same leaded test fuel which did not contain a phosphorus additive.

Since observations were made on two engine phenomena, namely octane number requirement increase (ORI) and wild ping (WP), it is convenient to express the results of the former in terms of percent of the base line whereas the latter results are considered as percentage in reduction of wild ping. Thus, in the case of octane number requirement increase a smaller number denotes a more effective fuel additive. In contrast, a larger number in the case of reduction in wild ping indicates a greater effectiveness in the minimization of this problem. The superior effectiveness of my adjuvants regarding both of these deposit-induced engine problems is demonstrated by reference to Table I.

TABLE I

| Additive | Concentration of P, Theory | ORI, percent of Base Line | WP, percent Reduction |
|---|---|---|---|
| Tri-o-cresyl phosphate | 0.2 | 118 | 46 |
| Reaction product, 140 M.W. olefin and P₂S₅ (treated with aqueous sodium bicarbonate) and 2 percent C₁₂ amine | 0.2 | 107 | 54 |
| Reaction product, 140 M.W. olefin and P₂S₅ and 4 percent C₁₂ amine | 0.1 | 102 | 64 |
| Phosphorus sesquisulfide | 0.2 | 112 | 56 |
| Reaction product, 140 M.W. olefin and P₂S₅ | 0.3 | 96 | 65 |

The above data, although not shown in the FIGURE because they were obtained by a different test procedure, further demonstrate the greater effectiveness in the reduction of wild ping produced by my adjuvants as compared with phosphorus compounds free from phosphorus-to-sulphur bonds.

Comparable increased effectiveness is similarly obtained when other improved compositions of this invention are used for the attainment of the objectives as set forth hereinbefore. When such adjuvants as (N,N-dimethyl-amido)-diethyl-thionophosphate; di-(N,N-di-n-decyl-amido)-n-propyl-thionophosphite; O,O-dimethyl-n-pentyl-thionophosphite; tri-n-hexyl phosphine sulfide; dimethyl-t-nonyl-phosphine sulfide; n-heptyl-dibutane-thionophosphinate; isohexyl-dibutane-thiophosphinate; di-t-butyl-methane-thionothiophosphonate; n-hexyl-n-heptyl-ethane-dithiothionophosphonate; di - (N,N-di-n-hexyl-amido)-ethane-thionophosphonate; dimethyl-sec-decyl-tri-thiothionophosphate; ethyl - propyl-t-butyl - thionophosphate; (N,N-dimethyl-amido)-O-ethyl-isopropyl-thiophosphate; tri-n-butyl thionophosphate; tri-isopropyl thionophosphate; and the like are used in accordance with this invention particularly striking reduction in wild ping results.

Consideration was also give to the effectiveness of my compounds in the alleviation of spark plug fouling. A standard test procedure was utilized involving operating on a dynamometer stand a modern automobile possessing a high compression V–8 engine under operating conditions conducive to spark plug fouling. The criterion used is the average hours required until three spark plugs have failed as shown by a resistance drop below 1.0 megohm during 20 seconds of a controlled engine acceleration. In all instances, recourse was had to a commercially available gasoline containing 3.0 milliliters of tetraethyllead per gallon as a conventional antiknock mixture. Base lines were established by using this fuel to obtain a standard period of engine operation required for three spark plug failures to be detected. Comparative tests showing the effectiveness of various phosphorus compounds were then conducted.

The operating conditions utilized in the spark plug fouling test procedure are summarized below:

Modern automobiles equipped with high compression ratio V–8 engines, operated at 1500 r.p.m. road load on the dynamometer stand, are used to evaluate spark plug fouling. Spark plugs are rated hourly in their individual cylinders during full-throttle operation following controlled full-throttle acceleration from 1500 r.p.m. road load to 3200 r.p.m. full-throttle load. Spark plug failure is indicated by a low shunt resistance of 1 megohm or less as measured by a Biddle megohmmeter during the first 20 seconds of full-throttle operation. Three spark plug failures constitute spark plug life due to fouling. Two variations of the test method, involving ignition timings of 26 and 32° BTC, were used in the engine operation summarized below.

Load _____ B.H.P__ 9.3
Speed _____ r.p.m__ 1500
Fuel-air ratio _____ 0.075
Ignition timing _____ ° BTC__ 26 or 32
Coolant temperature _____ ° F__ 170

The test also is used to observe secondary items of deposition and induction system cleanliness. A commercial aviation-grade base stock plus 3.0 ml./gal. TEL as a standard antiknock mixture containing 0.5 theory of bromine as ethylene, 1.0 theory of chlorine as ethylene dichloride, and tetraethyllead.

Typical addition agents of this invention were found to markedly increase spark plug life by increasing the average hours until three spark plug failures were detected. By way of example, typical adjuvants of this invention, namely phosphorus sesquisulfide, tri-m-cresyl thionophosphate, and the reaction product obtained by reaction between a 140 molecular weight mono-olefin polymer and phosphorus pentasulfide, when employed at a concentration of 0.2 theory of phosphorus the average hours to produce three spark plug failures were 138, 114 and 90 respectively. These periods amounted to a percentage increase in spark plug life amounting respectively to 214, 149, and 105 percent. Likewise, when 0.1 theory of phosphorus as the product obtained by reaction between a 420 molecular weight mono-olefin polymer and phosphorus pentasulfide was subjected to the same test procedure 100 hours of engine operation were required to produce three spark plug failures amounting to an increase in spark plug life amounting to an increase in spark plug life amounting to 127 percent. In contrast to these results, representative phosphorus additives which do not contain phosphorus-to-sulfur bonds which contained at least one carbocyclic radical failed to produce such an increase in spark plug life when employed at a concentration of 0.2 theory of phosphorus. In at least three instances, such phosphorus compounds produced a decrease in spark plug life from that obtained with a phosphorus free fuel.

An adjuvant of this invention was also subjected to a considerable number of road tests in which comparisons were made with conventional leaded fuels. Measurements were made of spark plug failures, autoignition requirement, and octane number requirement increase. The material within the scope of this invention, the reaction product of a 140 molecular weight olefin with $P_2S_5$, produced considerably superior results. For example, it was found that this typical adjuvant when employed at a concentration of 0.1 theory of phosphorus in a commercial fuel containing 3 milliliters of tetraethyllead as a commercial antiknock mixture reduced the autoignition requirement of the engine by 5 octane numbers while concurrently the octane number requirement increase amounted to but 1.5 octane numbers. In contrast to this, the same fuel which had been treated with 0.2 theory of phosphorus as mixed tricresyl phosphates resulted in a decrease in autoignition requirement of 2.5 octane numbers and an increase in octane number requirement of 4 octane numbers.

Before considering in detail the nature of the phosphorus materials which can be employed in accordance with this invention, reference shall now be made to the type of organic radicals which are present in those embodiments of my adjuvants which can be considered as organic phosphorus compounds. Generally speaking, it has been found that efficacious adjuvants of the organic phosphorus type are those which contain up to about 30 carbon atoms in the form of alkyl, alkenyl, cycloalkyl, aralkyl, aryl, and alkaryl radicals. To illustrate, I have found that organic phosphorus compounds as described above containing alkyl groups such as methyl, ethyl, propyl, isopropyl, butyl, isobutyl, sec-butyl, t-butyl, and likewise the various positional isomers of the hexyl, heptyl, octyl, nonyl, decyl, dodecyl, octadecyl, and the like up to and including about triacontyl prove most satisfactory and thus are a preferred class of my adjuvants. Additionally, for solubility purposes, it is preferable to employ alkyl radicals containing at least 3 carbon atoms. Where, however, a phosphorus compound contains several alkyl radicals these can contain proportionally less carbon atoms per radical. Thirdly, generally speaking, compounds containing a plurality of sulfur atoms attached to a phosphorus material in question contributes a considerable degree of effect upon hydrocarbon solubility. Where the radicals in question are cycloalkyl, they should preferably contain from 6 to about 10 carbon atoms. The alkenyl radicals preferably contain from 4 to about 30 carbon atoms. Likewise, in the case of the aralkyl, aryl, and alkaryl radicals there should be present respectively from 7 to 10, from 6 to 10, and from 7 to 10 carbon atoms.

The organic radicals as above described can also be substituted with bromine or chlorine atoms. Thus, preferred halogen substituted radicals are the bromo- or chloro-substituted alkyl groups containing up to about 30 carbon atoms and up to 3 bromine and/or chlorine atoms.

*Organic Compounds Containing Trivalent Phosphorus*

Within this class of phosphorus-containing materials suitable for use in accordance with this invention are two types of compounds, those which contain one atom of phosphorus and those which contain a plurality of phosphorus atoms. Although there are many types of compounds falling within the first category, reference shall now be made to those which are most suitable for my purposes.

(1) *Thiophosphinite esters.*—This class of compounds can be represented by the general formula $$R_1R_2PSR_3$$

wherein each of $R_1$, $R_2$ and $R_3$ can be the same or different and is selected from the group consisting of alkyl, cycloalkyl, aralkyl, aryl, and alkaryl of the type described hereinbefore. Typical thiophosphinite esters which can be employed as adjuvants include such substances as dimethane-methyl-thiophosphinite;
dimethane-sec-butyl-thiophosphinite;
dimethane-isohexyl-thiophosphinite;
dimethane-(2-cyclohexylethyl)-thiophosphinite;
diethane-n-pentyl-thiophosphinite;
diethane-isoheptyl-thiophosphinite;
diethane-isooctyl-thiophosphinite;
diethane-n-nonyl-thiophosphinite;
diethane-n-decyl-thiophosphinite;
dibutane-methyl-thiophosphinite;
dibutane-ethyl-thiophosphinite;
dibutane-t-butyl-thiophosphinite;
dibutane-o-tolyl-thiophosphinite;
ethane-butane-n-hexyl-thiophosphinite;
ethane-butane-(4-cyclohexyl-n-butyl)-thiophosphinite;
dibenzene-n-octyl-thiophosphinite;
dibenzene-sec-hexyl-thiophosphinite;
dibenzene-n-decyl-thiophosphinite;
dibenzene-(m-ethylphenyl)-thiophosphinite;
dipropane-methyl-thiophosphinite;
dipropane-ethyl-thiophosphinite;
dipropane-n-octyl-thiophosphinite;
dipropane-(2,3-dimethylphenyl)-thiophosphinite;
and the like.

(2) *Thiophosphonite esters.*—Such esters can be represented by the general formulae $$R_1P(OR_2)(SR_3); R_1P(SR_2)(SR_3)$$

wherein each of $R_1$, $R_2$ and $R_3$ can be the same or different and is selected from the group consisting of alkyl, cycloalkyl, aralkyl, aryl, and alkaryl of the type described hereinbefore. Such compounds are typified by dimethyl-methane-thiophosphonite;
dimethyl-ethane-thiophosphonite;
diethyl-butane-thiophosphonite;
diethyl-pentane-thiophosphonite;
di-isopentyl-ethane-thiophosphonite;
di-n-pentyl-benzene-thiophosphonite;
dicyclohexyl-propane-thiophosphonite;
di-(β-phenylethyl)-pentane-thiophosphonite;
di-α-naphthyl-methane-thiophosphonite;
di-sec-butyl-benzene-thiophosphonite;
di-n-heptyl-propane-thiophosphonite;
di-(p-ethylphenyl)-pentane-thiophosphonite;
di-cyclohexyl-butane-thiophosphonite;
di-n-decyl-propane-thiophosphonite;
di-isooctyl-butane-thiophosphonite;
di-(γ-phenylpropyl)-methane-thiophosphonite;
methyl-ethyl-ethanedithiophosphonite;
methyl-n-hexyl-butane-dithiophosphonite;
O-methyl-n-butyl-propane-thiophosphonite;
and the like.

(3) *Amido thiophosphonites.*—These adjuvants are represented by the general formula $$R_1P(SR_2)(NR_3R_4)$$

wherein each of $R_1$, $R_2$, $R_3$ and $R_4$ can be the same or different and is selected from the group consisting of alkyl, cycloalkyl, aralkyl, aryl and alkaryl of the type described hereinbefore. Typical examples include (N,N-di-methyl-amido)-cyclohexyl - methane - thiophosphonite;
(N,N-methyl-amido)-n-butyl-butane-thiophosphonite;
(N,N-diethyl-amido)-isooctyl-butane-thiophosphonite;
(N,N-di-n-butyl-amido)-sec-pentyl - benzene - thiophosphonite;
(N,N-di-n-nonyl-amido)-n-hexyl-methane - thiophosphonite;
(N,N-isoheptyl-amido)-n-decyl-propane-thiophosphonite;
(N,N-dicyclohexyl-amido)-n-decyl-pentane - thiophosphonite;
(N,N-di-n-decyl-amido)-isopentyl-butane - thiophosphonite;
(N-methyl-N-ethyl-amido)-propyl - methane - thiophosphonite;
(N-ethyl-N-methyl-amido)-t-butyl - pentane - thiophosphonite;
(N-decyl-N-heptyl)-amido-isononyl-methane - thiophosphonite;
(N-pentyl-N-heptyl)-amido-cyclohexyl - butane - thiophosphonite;
(N-cyclohexyl-N-α-naphthyl-amido)-n-pentyl - methane-thiophosphonite;
(N,N-di-isooctyl-amido)-n-decyl-butane-thiophosphonite;
(N,N-di-α-naphthyl-amido)-sec-hexyl-benzene - thiophosphonite;
(N,N-di-n-decyl-amido)-cyclohexyl - pentane - thiophosphonite;
and the like.

(4) *Amido thiophosphites.*—These adjuvants possess the general formulae $$P(SR_1)(SR_2)(NR_3R_4);\ P(OR_1)(SR_2)(NR_3R_4);$$
$$P(SR_1)(NR_2R_3)(NR_4R_5)$$

wherein each of $R_1$, $R_2$, $R_3$, $R_4$ and $R_5$ can be the same or different and is selected from the group consisting of alkyl, cycloalkyl, aralkyl, aryl and alkaryl of the type described hereinbefore. Amido thiophosphites which can be employed as adjuvants of this invention are typified by such substances as (N,N-dimethyl-amido)-diethyl-thiophosphite;
(N,N-diethyl-amido)-dimethyl-thiophosphite;
(N,N-di-n-propyl-amido)-dimethyl-thiophosphite;
(N,N-di-sec-butyl-amido)-di-isopropyl-thiophosphite;
(N,N-di-n-hexyl-amido)-dimethyl-thiophosphite;
(N,N-di-isohexyl-amido)-diethyl-thiophosphite;
(N,N-di-sec-heptyl-amido)-dimethyl-thiophosphite;
(N,N-di-n-heptyl-amido)-dicyclohexyl-thiophosphite;
(N,N-di-n-nonyl-amido)-di-n-decyl-thiophosphite;
(N-methyl-N-ethyl-amido)di-ethyl-dithiophosphite;
(N-n-octyl-N-decyl-amido)-cyclohexyl-ethyl-dithiophosphite;
(N-n-heptyl-N-isohexyl-amido)-α-naphthyl-isobutyl-dithio-phosphite;
N-neo-pentyl-N-methyl-amido)-di-(o-tolyl)-dithiophosphite;
(N,N-di-β-phenylethyl-amido)-dimethyl-thiophosphite;
di-(N-methyl-N-o-cresyl-amido)-methyl-thiophosphite;
di-(N,N-dimethyl-amido)-methyl-thiophosphite;
di-(N,N-di-n-decyl-amido)-n-nonyl-thiophosphite;
di-(N,N-di-cyclohexyl-amido)-(γ-phenylpropyl)-thiophosphite;
di-(N-iso-octyl-N-isopentyl-amido)-o-tolyl-thiophosphite;
di-(N,N-di-(cyclohexylethyl)-amido)-n-decyl-thiophosphite;
di-(N-n-pentyl-N-n-butyl-amido)-cyclohexyl-thiophosphite;
and the like.

(5) *Thiophosphite esters.*—These materials can be represented by the general formulae $$P(SR_1)(SR_2)(SR_3);\ P(SR_1)(SR_2)(OR_3);$$
$$P(SR_1)(OR_2)(OR_3)$$

wherein each of $R_1$, $R_2$, and $R_3$ can be the same or different and is selected from the group consisting of alkyl, cycloalkyl, aralkyl, aryl, and alkaryl of the type described hereinbefore. Typical examples include trimethyltrithiophosphite,
triethyltrithiophosphite,
tri-n-propyltrithiophosphite,
tri-isobutyltrithiophosphite,
tri-n-pentyltrithiophosphite,
tri-isohexyltrithiophosphite,
tri-n-heptyltrithiophosphite,
tri-n-octyltrithiophosphite,
tri-n-nonyltrithiophosphite,
tri-n-decyltrithiophosphite,
tricyclohexyltrithiophosphite,
tri-(β-phenylethyl)-trithiophosphite,
trimethyldithiophosphite,
tri-isopropyldithiophosphite,
tri-t-butyldithiophosphite,
tri-n-octylthiophosphite,
tri-n-decylthiophosphite,
tri-neo-pentylthiophosphite,
di-n-hexyl-ethyl-trithiophosphite,
dimethyl-O-ethyl-dithiophosphite,
dibutyl-O-ethyldithiophosphite,
di-isopentyl-n-decyl-trithiophosphite;
O,O-di-n-decyl-n-nonyl-thiophosphite;
di-n-heptyl-O-isohexyl-dithiophosphite;
O,O-dimethyl-n-pentyl-thiophosphite;
methyl-ethyl-sec-heptyl-trithiophosphite;
O-methyl-isopropyl-n-nonyl-dithiophosphite;
O-ethyl-O-n-hexyl-n-heptylthiophosphite;
ethyl-isoheptyl-n-decyl-trithiophosphite;
isopropyl-isobutyl-n-pentyl-trithiophosphite;
O-n-octyl-n-heptyl-n-nonyl-dithiophosphite;
O-isodecyl-n-nonyl-methyl-dithiophosphite;
isooctyl-sec-hexyl-neo-pentyl-trithiophosphite;
and the like.

It will be apparent to one skilled in the art that trivalent acids of phosphorus which contain at least one sulfur atom are capable of existing in polymeric forms. Thus, phosphorus compounds of the type described hereinbefore which contain more than one phosphorus atom in the trivalent state can be employed as adjuvants in accordance with my invention. Of such compounds, however, it is preferable to employ those which contain either two or three phosphorus atoms.

*Organic Compounds Containing Pentavalent Phosphorus*

(1) *Phosphine sulfides.*—This class of compounds can be represented by the general formula $$R_1R_2R_3PS$$

wherein each of $R_1$, $R_2$ and $R_3$ can be the same or different and is selected from the group consisting of alkyl, cycloalkyl, aralkyl, aryl, and alkaryl of the type described hereinbefore. These compounds are exemplified by such materials as trimethyl phosphine sulfide;
triethyl phosphine sulfide;
tri-n-propyl phosphine sulfide;
tri-n-hexyl phosphine sulfide;
tri-n-nonyl phosphine sulfide;
tri-isoheptyl phosphine sulfide;
tri-n-decyl phosphine sulfide;

tri-cyclohexyl phosphine sulfide;
dimethyl-ethyl-phosphine sulfide;
diethyl-sec-hexyl phosphine sulfide;
di-n-propyl-t-butyl phosphine sulfide;
di-isononyl-n-heptyl phosphine sulfide;
di-n-hexyl-n-heptyl phosphine sulfide;
dimethyl-t-nonyl phosphine sulfide;
diisopropyl-n-decyl phosphine sulfide;
methyl-ethyl-n-decyl phosphine sulfide;
ethyl-t-decyl-n-nonyl phosphine sulfide;
n-hexyl-n-heptyl-n-nonyl phosphine sulfide;
ethyl-isooctyl-t-butyl phosphine sulfide;
methyl-isooctyl-isopropyl phosphine sulfide
and the like.

(2) *Sulfur-containing phosphinate esters.*—This type of pentavalent organic phosphorus compound can be represented by the general formulae $R_1R_2PO(SR_3)$; $R_1R_2PS(SR_3)$; $R_1R_2PS(OR_3)$ wherein each of $R_1$, $R_2$ and $R_3$ can be the same or different and is selected from the group consisting of alkyl, cycloalkyl, aralkyl and alkaryl of the type described hereinbefore. These are typified by such substances as methyl-dimethane thiophosphinate;
methyldimethane-thionophosphinate;
ethyl-dimethane thiophosphinate;
n-heptyl-dibutane-thionophosphinate;
isohexyl-dibutane-thiophosphinate;
n-propyl-dibutane-thiophosphinate;
isopropyl-dimethane-thionophosphinate;
n-octyl-dibutane-thiophosphinate;
sec-nonyl-dimethane-thionophosphinate;
neo-pentyl-dibutane-thionothiophosphinate;
cyclohexyl-dibutane-thiophosphinate;
p-tolyl-diethane-thionophosphinate;
($\beta$-phenylethyl)-dimethane-thionothiophosphinate;
($\beta$-cyclohexylethyl)-dibutane-thionophosphinate;
o-tolyl-dimethane-thiophosphinate;
and the like.

(3) *Amido thiophosphinates.*—These compounds possess the general formula $R_1R_2PS(NR_3R_4)$ wherein each of $R_1$, $R_2$, $R_3$ and $R_4$ can be the same or different and is selected from the group consisting of alkyl, cycloalkyl, aralkyl, aryl, and alkaryl of the type described hereinbefore. Such substances include (N,N-diethyl-amido)-dimethane-thionophosphinate;
(N,N-di-isopropyl-amido)-dibutane-thionophosphinate;
(N,N-di-t-butyl-amido)-dipropane-thionophosphinate;
(N-methyl-N-isoheptyl-amido)-dibenzene-thionophosphinate;
(N-sec-heptyl-N-n-nonyl-amido)-dimethane-thionophosphinate;
(N-ethyl-N-isohexyl-amido)-dipropane-thionophosphinate;
(N-cyclohexyl-N-n-hexyl-amido)-dibenzene-thionophosphinate;
(N,N-diphenyl-amido)-dimethane-thionophosphinate;
(N,N-di-o-tolyl-amido)-dipropane-thionophosphinate;
(N,N-di(2,6-dimethylphenyl)-amido)-dipropane-thionophosphinate;
(N,N-di-$\alpha$-naphthyl-amido)-dimethane-thionophosphinate;
(N,N-di-(4-cyclohexylbutyl)-amido)-dipropane-thionophosphinate;
and the like.

(4) *Sulfur-Containing phosphonate esters.*—Materials of this general nature possess the general formulae $R_1PO(OR_2)(SR_3)$; $R_1PO(SR_2)(SR_3)$;
$R_1PS(OR_2)(OR_3)$; $R_1PS(OR_2)(SR_3)$;
$R_1PS(SR_2)(SR_3)$ wherein each of $R_1$, $R_2$ and $R_3$ can be the same or different and is selected from the group consisting of alkyl, cycloalkyl, aralkyl, aryl, and alkaryl of the type described hereinbefore. Such substances are typified by dimethyl-benzene - thiophosphonate; diethyl - benzene - thiophosphonate; di-isopropyl-methane-dithiophosphonate; diethyl-pentane-thiophosphonate; diethyl-ethane-thionothiophosphonate; di-n-propyl-ethane-dithiothionophosphonate; di-t-butyl-methane-thionothiophosphonate; di-isohexyl-benzene-thionophosphonate; di-n-decyl-pentane-thiophosphonate; di-sec-nonyl-ethane-thionothiophosphonate; di-isopentyl-pentane-dithiophosphonate; O-methyl-s-isoheptyl-methane-thiothionophosphonate; methyl-ethyl-pentane-dithiophosphonate; O-ethyl-isoproply-benzene-thionothiophosphonate; n-hexyl-n-heptyl-ethane-dithiothionophosphonate; O-isoctyl-cyclohexyl-ethane-thiophosphonate; and the like.

(5) *Sulfur-Containing amido phosphonates.*—These compounds possess the general formulae $R_1PO(SR_2)(NR_3R_4)$; $R_1PS(OR_2)(NR_3R_4)$;
$R_1PS(SR_2)(NR_3R_4)$; $R_1PS(NR_2R_3)_2$ wherein each of $R_1$, $R_2$, $R_3$ and $R_4$ can be the same or different and is selected from the group consisting of alkyl, cycloalkyl, aralkyl, aryl, and alkaryl of the type described hereinbefore. Typical examples include such substances as (N,N-diethyl-amido)-sec-butyl-benzene-thiophosphonate; (N,N-di-isohexyl-amido)-n-heptyl-benzene-thiophosphonate; (N,N-di-n-heptyl-amido)-sec-nonyl-methane-thionophosphonate; (N,N-di-n-decyl-amido)-sec-nonyl-methane-thionophosphonate; (N,N-di-isooctyl-amido)-ethyl-methane-thiono-phosphonate; (N,N-di-2-ethylhexyl)-amido)-($\beta$-phenylethyl)-methane-thionophosphonate; (N,N-di-n-octyl-amido)-methyl-pentane-thionothiophosphonate; (N,N-diethyl-amido)-ethyl-pentane- thionophosphonate; (N,N-diphenyl-amido)-methyl-benzene-thiophosphonate; N,N-di-$\alpha$-naphthyl-amido)-cyclohexyl-ethane-thionothiophosphonate; di-(N,N-dimethyl-amido)-benzene-thionophosphonate; di-(N,N-diethyl-amido)- benzene - thionophosphonate; di-(N,N-di-n-propyl-amido)-benzene - thionophosphonate; di-(N,N-di-sec-butyl-amido)-methane-thionophosphonate; di-(N,N-di-neo-pentyl-amido)-methane-thionophosphonate; di-(N,N-di-isooctyl-amido)-pentane-thionophosphonate; di-(N,N-di-sec-nonyl-amido-)pentane-thionophosphonate; di-(N,N-di-isoheptyl-amido)-ethane-thionophosphonate; di-(N,N-di-n-hexyl-amido)-ethane - thionophosphonate; di-(N,N-di-cyclohexyl-amido)-ethane-thionophosphonate; and the like.

(6) *Sulfur-Containing phosphate esters.*—This type of pentavalent organic phosphorus compound can be represented by the general formulae $PO(SR_1)(OR_2)(OR_3)$; $PO(SR_1)(SR_2)(OR_2)$;
$PO(SR_1)(SR_2)(SR_3)$; $PS(OR_1)(OR_2)(OR_3)$;
$PS(OR_1)(OR_2)(SR_3)$; $PS(OR_1)(SR_2)(SR_3)$;
$PS(SR_1)(SR_2)(SR_3)$ wherein each of $R_1$, $R_2$ and $R_3$ can be the same or different and is selected from the group consisting of alkyl, cycloalkyl, aralkyl, aryl, and alkaryl of the type described hereinbefore. Typical examples include trimethyl thionophosphate; triethyl thionophosphate; tri-(2-ethylhexyl)-thionophosphate; tri-isoheptyl thionophosphate; tri-sec-nonyl thionophosphate; tri-n-decyl thiono-phosphate; tri-cyclohexyl thionophosphate; dimethyl-O-ethyl-dithio-thionophosphate; O,O-diethyl-n-heptyl-thionothiophosphate; O,O-dimethyl-isopropyl-thionothiophosphate; O,O-di-n-propyl-t-butyl-thionothiophosphate; O,O-di-sec-butyl-isononyl-thionothiophosphate; dimethyl-sec-decyl-trithiothionophosphate; diethyl-O-t-butyl-dithiothionophosphate; dicyclohexyl-O-isobutyl-di-thiothionophosphate; O,O-di-($\beta$-phenylethyl)-sec-decyl-thiophosphate; di-isoheptyl-t-nonyl-trithiothionophosphate; di-(2,2,4-trimethyl-n-pentyl)-(cyclohexyl)-trithiothionophosphate; methyl-ethyl-n-butyl-thionophosphate; ethyl-propyl-t-butyl-thionophosphate; methyl-ethyl-isohexyl-thionophosphate; O-isopropyl-O-neo-pentyl-isoheptyl-thionothiophosphate; O-t-butyl-O-sec-heptyl-n-octyl-thionothiophosphate; tri-sec-butyl thionophosphate; isopropyl-O-cyclohexyl-O-(β-phenylethyl)-thiophosphate; tricresyl thionophosphate; tri-n-butyl thionophosphate; tri-n-propyl thionophosphate; tri-isobutyl-trithiothionophosphate; tri-isopropyl-trithiothionophosphate; triethyl thionophosphate; triethyltrithiothionophosphate; and the like.

(7) *Sulfur-Containing amido phosphates.*—These compounds possess the general formulae

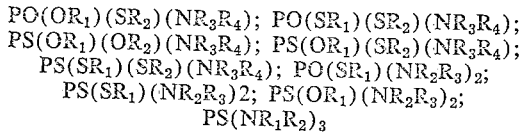

wherein each of $R_1$, $R_2$, $R_3$ and $R_4$ can be the same or different and is selected from the group consisting of alkyl, cycloalkyl, aralkyl, aryl, and alkaryl of the type described hereinbefore. These compounds are exemplified by such materials as (N,N-dimethyl-amido)-di-ethyl-thiophosphate; (N,N-dimethyl-amido)-di-isopropyl-thiophosphate; (N,N-dimethyl-amido)-di-n-butyl-thiophosphate; (N,N-dimethyl-amido)-di-isohexyl-thiophosphate; (N,N-dimethyl-amido) - di -sec - heptyl - thiophosphate; (N,N-dimethyl-amido)-di-isononyl-thiophosphate; (N,N-dimethyl-amido)-di-n-octyl-thiophosphate; (N,N-diethyl-amido)-dimethyl-dithio-phosphate; (N,N-diethyl-amido)-di-isopropyl-thionophosphate; (N,N-diethyl-amido)-di-t-butyl-thionophosphate, (N,N-di-sec-butyl-amido)-di-n-propyl-thionothiophosphate, (N,N-di-t-nonyl-amido)-di-methyl-thionothiophosphate, (N,N-di-isoheptyl-amido)-diethyl-dithiothionophosphate, (N,N-diphenyl-amido)-di-cyclo-hexyl-thionophosphate, (N,N-di-sec-butyl-amido)-dicyclohexyl-dithiophosphate, (N,N-dimethyl-amido)-di-(2,3-dimethylphenyl)-dithiophosphate, (N,N-dicyclohexyl-amido)-di-(γ - phenylpropyl) - dithiothionophosphate, (N,N-dimethyl-amido)-O-ethyl-isopropyl - thiophosphate, (N,N-diethyl-amido) - methyl-t-butyl - dithiophosphate, (N,N-di-isopropyl-amido) - isopropyl-neo-pentyl-thionophosphate, (N,N-di-n-butyl-amido)-isopentyl-O-n-hexyl-thionothiophosphate, (N,N-di-n-pentyl-amido) - methyl-ethyl-di-thiothionophosphate, (N,N-di-n-hexyl-amido)-n-propyl-O-n-decyl-thiophosphate, (N,N-di-sec-heptyl-amido)-t-nonyl-cyclo-hexyl-dithiophosphate, di(N,N-dimethyl-amido)-ethyl-thiophosphate, di-(N,N-diethyl-amido)-isopropyl - thionophosphate, di-(N,N-diethyl-amido)-isopropyl-thionophosphate, di(N,N-di-sec-butyl-amido)-n-propyl - thionothiophosphate, di-(N,N-n-pentyl-amido)-methyl-thiophosphate, di-(N,N-di-isooctyl-amido)-ethyl-thiophosphate, di - (N,N-di-t-nonyl-amido)-methyl-thiophosphate, di-(N,N-di-n-decyl-amido)-ethyl-thionophosphate, di-(N,N-dicyclohexyl-amido)-n-butyl-thionothiophosphate, tri - (N,N-dimethyl-amido)-thionophosphate, tri-(N,N-diethyl-amido)-thionophosphate, tri-(N,N-di-isopropyl-amido)-thionophosphate, tri-(N,N-di-n-butyl-amido)-thionophosphate, tri-(N,N-di-iso-butyl-amido)-thionophosphate, tri-(N,N-di-sec-pentyl-amido)-thionophosphat, tri - (N,N-di-n-hexyl-amido)-thionophosphate, tri-(N,N-2-ethyl-n-heptyl) - amido) - thionophosphate, tri-(N,N-di-n-octyl-amido)-thionophosphate, tri-(N,N-di-sec-monyl-amido)-thionophosphate, tri(N,N-di-n-decyl-amido)-thionophosphate, and the like.

(8) *Reaction products of indeterminate structure.*—It is well known in the art that reactive phosphoros sulfides such as $P_2S_5$, $P_4S_7$ and the like are capable of reacting with a considerable number of various organic compounds to produce complex reaction products which have heretofore been largely undefinable. However, it is known that such compounds contain at least one phosphorus-to-sulfur bond and in many cases, a plurality of such bonds. Moreover, it has been established that many of these reaction products exist in the form of dimers and other polymeric phosphorus-containing materials. Thus, reaction products obtained by reacting phosphorus sulfides with alcohols, mercaptans, phenols, thiophenols, olefins, aromatic hydrocarbons, active hydrogen-containing paraffins, nitriles, amines and the like can be employed as adjuvants in accordance with my invention. As indicated hereinbefore the important criterion to be met by such products is that they contain at least one phosphorus-to-sulfur bond which can be either covalent or coordinate covalent. Of the aforementioned types of products suitable for use in accordance with my invention the phosphorus sulfide reaction products obtained with olefinic hydrocarbons, amines, alcohols, mercaptans, and phenols are generally preferred because of their greater hydrocarbon solubility and ease of preparation. Both the nature of the materials which can be used to form the above mentioned reaction products and the conditions to be employed are described in National Petroleum News, 37, 1001–10, (1945), Petroleum Processing, December, 1952, pages 1780–4, and the references cited in these papers.

The phosphorus- and sulfur-containing adjuvants discussed thus far have been of the organic type. However, as indicated, a particularly effective material is phosphorus sesquisulfide, $P_4S_3$, an inorganic phosphorus- and sulfur-containing material which possesses an unusually high degree of hydrocarbon solubility notwithstanding the fact that it does not contain any carbon atoms. As will be apparent from the discussion hereinafter this material is of considerable merit in accomplishing the objects of this invention.

The methods for the preparation of the phosphorus materials described hereinbefore will be familiar to one skilled in the art. Moreover, there have been published several treatises on the subject including Kosolapoff, "Organo Phosphorus Compounds."

In preparing many of my adjuvants recourse can be had to commercially available mixtures of the raw materials in question. Obviously, this often results in considerable saving at least insofar as raw material costs are concerned.

The additives of this invention are employed in petroleum hydrocarbons suitable for use in internal combustion spark-fired engines. Such fuels comprise straight run, thermally cracked, catalytically cracked, reformed and catalytically formed fuels, fuels made by other processes and blends thereof. One preferred embodiment in which much benefit is derived from this invention comprises fuels containing a substantial proportion of catalytically cracked fuels.

It is to be understood that the problem of deposit-induced autoignition is associated with both engine design and fuel type; that is, octane number, lead content and other properties. Additives for the reduction of wild ping are particularly effective in fuels produced by modern refinery techniques predominating in stocks prepared by catalytic cracking and reforming processes. Straight-run gasoline and fuels prepared by thermal cracking techniques are less sensitive to the incorporation therein of wild ping additives.

It is an important feature of this invention that problems associated with engine deposits are alleviated. Thus, particular benefit is derived by employing the additives in so-called leaded fuels. While this invention relates to fuels containing organolead antiknock agents in general, it is particularly directed to fuels containing alkyllead antiknock agents, of which the most important commercial antiknock is tetraethyllead. Similar advantage is obtained, however, when used in conjunction with such materials as tetraphenyllead, tetramethyllead, tetraethyllead, dimethyldiethyllead, methyltriethyllead, and the like. Likewise, the phosphorous agents of this invention can be admixed with antiknock fluid, such as conventional tetraethyllead-ethylene dichloride-ethylene dibromide blends, and the antiknock fluid-phosphorous compound mixture subsequently added to the fuel with good results.

Organolead antiknock agents are generally employed with scavengers, the most common of which are ethylene dichloride and ethylene dibromide. However, the additives of this invention perform equally well in the presence of other scavengers known in the art such as those disclosed in U.S. 1,592,954; 1,668,022; 2,364,921; 2,398,281; 2,479,900; 2,479,901; 2,479,902; 2,479,903; and 2,496,983. Likewise, the adjuvants of this invention can be used in conjunction with other well known motor fuel adjuvants such as antioxidants, organolead stabilizers, organic dyes, solubilizers, and indeed with other catalytically active materials frequently employed in fuel.

Tetraethyllead is ordinarily employed in two formulations or fluids. For automotive use tetraethyllead is employed with a mixture of bromide and chloride scavengers, while for aviation use, it is ordinarily employed with the bromide alone. The additives of this invention are adaptable to either fluid. It has been suggested that certain phosphorus compounds be employed as scavengers for tetraethyllead-containing fuel compositions. The additives of this invention comprising gasoline-soluble phosphorus compounds in which at least one phosphorus-to-sulfur bond occurs can be employed for this purpose and still exhibit the unexpected advantageous effect in reduction of deposit-induced engine problems attributed to the presence of this phosphorus-to-sulfur bond. The halogen scavenger can be present in the range of about 0.5 to 1.5 theories. For certain purposes, when employing the additives of this invention the proportions of halide scavengers can be varied, although in a preferred embodiment for automotive use it is customary to employ 0.5 theory of bromide scavenger as ethylene dibromide and 1.0 theory of chloride scavenger as ethylene dichloride.

In general, the additives of this invention can be employed in fuels containing from between about 0.2 and about 4 milliliters of tetraethyllead per gallon for automotive use. A preferred range providing particular improvement in operation is between about 1 and 4 milliliters (1.7 to 6.6 grams) of tetraethyllead per gallon. It is to be recognized that with increasing compression ratio of internal combustion engines greater benefit is derived from higher concentrations of tetraethyllead. Thus, the additives of this invention make such concentrations practical by alleviating secondary problems associated therewith. Thus, fuels containing up to about 4.75 grams of lead per gallon are contemplated. In general, fuels designed for use in aircraft engines contain amounts of lead up to about 6.3 grams of lead per gallon. In this concentration range, also the additives of this invention are particularly useful. Within the above ranges of lead in the fuel, the additives of this invention are employed such that in a preferred embodiment there is contained about 0.1 to 0.3 theory of phosphorus based upon the lead in the fuel.

The additives of this invention are thus seen to accomplish the dual purpose of reducing or eliminating deposit-induced autoignition or wild ping and improving spark plug life while at the same time introducing a minimum of side effects. Such materials thus provide ignition control, that is, they eliminate problems associated with, and improve the overall operation of, the ignition system as it pertains to the combustion process in an internal combustion spark-fired engine.

Fuel compositions containing the additives of this invention are readily prepared by conventional blending techniques. Fuels can be treated with the antiknock fluid and subsequently blended with the additive of this invention or the antiknock compound can be added to the fuel containing the sulfur-containing phosphorous additive. In certain instances I prefer to employ a fluid consisting of a lead antiknock agent and a sulfur-containing phosphorous additive of this invention which is thereupon incorporated into the fuel.

Having fully described the new compositions of matter comprising the present invention, the utility thereof, and the best means devised for their preparation, I do not intend that my invention be limited except within the spirit and scope of the appended claims.

I claim:

1. A hydrocarbon motor fuel of the gasoline boiling range containing an antiknock quantity of tetraalkyl lead and an amount, sufficient to reduce spark plug fouling, of a thiophosphite ester having the formula $(RS)_3P$ in which R is a lower molecular weight alkyl radical.

2. A hydrocarbon motor fuel of the gasoline boiling range containing an antiknock quantity of tetraethyl lead and an amount, sufficient to reduce preignition and spark plug fouling, of a dithiophosphate having the formula

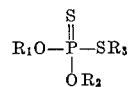

wherein $R_1$ and $R_2$ are each alkyl radicals of from 1 to about 8 carbon atoms and $R_3$ is an alkyl radical having 2 to about 16 carbon atoms.

References Cited in the file of this patent

UNITED STATES PATENTS

| | | |
|---|---|---|
| 2,335,953 | McCracken et al. | Dec. 7, 1943 |
| 2,405,560 | Campbell | Aug. 13, 1946 |
| 2,534,217 | Bartleson | Dec. 19, 1950 |
| 2,765,220 | Yust et al. | Oct. 2, 1956 |
| 2,843,465 | Yust et al. | July 15, 1958 |

FOREIGN PATENTS

| | | |
|---|---|---|
| 683,405 | Great Britain | Nov. 26, 1952 |